United States Patent

Avery

[15] 3,693,666

[45] Sept. 26, 1972

[54] FLOW CONTROL VALVE

[72] Inventor: Paul A. Avery, Fort Collins, Colo.

[73] Assignee: Avco Corporation, Stratford, Conn.

[22] Filed: May 3, 1971

[21] Appl. No.: 139,580

[52] U.S. Cl. ................................................137/57
[51] Int. Cl. ............................................G05d 13/04
[58] Field of Search ........137/47, 53, 57, 58; 73/530, 73/534

[56] References Cited

UNITED STATES PATENTS 3,586,457   6/1971   Geary ......................137/57 X

Primary Examiner—Robert G. Nilson
Attorney—Charles M. Hogan and Gary M. Gron

[57] ABSTRACT

The disclosure illustrates an overspeed cutoff valve for a gas turbine engine. The valve has a rotatable base incorporating a Rolamite device in which a pair of rotatable elements and an S-shaped band are biased toward the axis of rotation of the base. At a predetermined R.P.M. the rotatable elements displace outwardly so that one of the walls which guides the rotatable elements may pivot and displace a valve element to a cutoff position.

10 Claims, 1 Drawing Figure

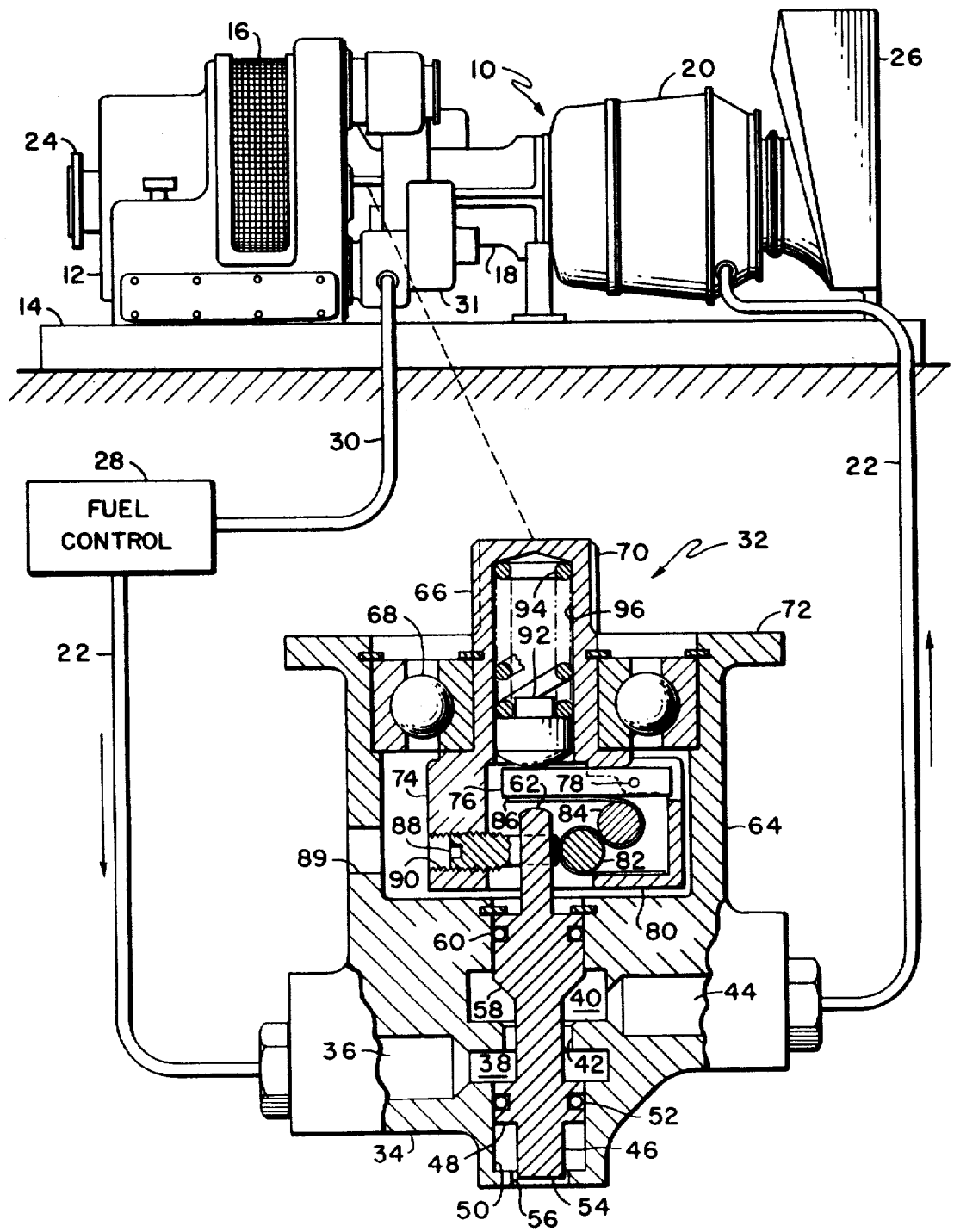

FLOW CONTROL VALVE

The present invention relates to flow control valves and more particularly to R.P.M. responsive valves of this type.

There are many different applications for speed responsive valves. A typical use is in a gas turbine engine where the valve assembly terminates flow to the engine when the engine R.P.M. exceeds a given safe operating level.

Present valves of this type utilize fly-ball weights that close a valve in response to outward displacement of the fly-ball weights by centrifugal force. While this type of device effectively terminates flow, it usually requires a high number of parts and because of the articulated linkage incorporated with it has a substantial amount of friction and wear.

It is an object of the present invention to provide a valve with the above general characteristics that has a minimum number of moving parts, low wear and a low amount of friction.

This end is achieved by a flow control valve which incorporates first and second opposed walls mounted for rotation about a central axis. The first wall is pivotally mounted at a point radially spaced from the central axis for displacing a flow control valve element. A plurality of rotatable control elements and a flexible band are positioned between the walls. The band is looped in a generally S-shaped fashion around the rotatable elements secured to the walls. The band biases the rotatable elements toward the central axis so that rotation at a predetermined level causes the rotatable elements to displace beyond the pivot point of the first wall. This permits it to pivot and displace the valve element from one flow control position to another.

The above and other related objects and features of the present invention will be apparent from a reading of the following description of the disclosure shown in the accompanying drawing and the novelty thereof pointed out in the appended claims.

The single FIGURE in the drawing illustrates a speed responsive flow control valve embodying the present invention, along with a gas turbine engine with which it may be used.

Referring to the drawing there is shown an industrial type gas turbine engine 10 comprising an inlet housing 12 mounted on a support base 14. The housing 12 has an inlet 16 for entry of air to a compressor 18 that pressurizes it for delivery to a series of combustors (not shown) within engine housing 20. Fuel is injected into the combustors through suitable fuel nozzles which receive fuel from a fuel supply conduit 22. The resultant mixture of pressurized air and fuel is ignited by well known means to produce a propulsive gas stream. The hot gas stream is discharged across a gas generator turbine (not shown) which drives a rotor in the compressor 18. From there the gas stream passes across a power turbine (also not shown) which drives a main power output shaft 24 through a suitable reduction gear positioned in housing 12. The hot gases are discharged through a scroll-like exhaust duct 26. Nozzle supply conduit 22 receives metered fuel from a fuel control 28 which in turn receives fuel via conduit 30 from an engine driven fuel pump 31. As is apparent to those skilled in the art, the fuel control 28 meters the fuel flow to maintain a scheduled engine R.P.M. and modifies the flow in accordance with various engine operating parameters.

As described below, the fuel system incorporates a flow control valve 32 to terminate flow whenever engine R.P.M. exceeds a given safe level. Valve 32 comprises a lower housing 34 having an inlet port 36 leading from conduit 22 to an upstream chamber 38. Chamber 38 is connected to a downstream chamber 40 through a central orifice 42. Downstream chamber 40 is connected to an outlet port 44 which leads to nozzle supply conduit 22.

A spool valve element 46 has a first shoulder 48 displaceable in a bore 50 formed in housing 34. A suitable O-ring 52 on shoulder 48 seals chamber 38. Valve element 46 has a projection 54 which extends through an opening 56 in housing 34 whenever a tapered shoulder 58 is displaceable through chamber 40 against orifice 42. Shoulder 58 has a suitable O-ring 60 to seal off chamber 40. The areas of shoulders 48 and 58 that are acted on by fluid pressures are selected so that the valve element 46 is biased away from orifice 42 or, in other words, toward an open position. Valve element 46 has a stem portion 62 which extends into a cylindrical upper housing 64.

A rotatable base comprising a shaft 66 is journaled in housing 64 by suitable bearing assembly 68. Shaft 66 has splines 70 that receive a rotatable input from the engine (note the mechanical connection) when the housing 64 is mounted on the engine at flange 72. Integral with shaft 66 is a wall support portion 74 having a first wall element 76 pivotally mounted to base 74 at 78. Point 78 is spaced from the axis of rotation of the base. A second fixed wall element 80 is integral with base 74 and also extends generally radially inward toward the axis of rotation of the base. A pair of rotatable elements 82 and 84 are positioned for rolling movement between wall elements 80 and 76. The diameter of the elements 82 and 84 are selected so that they exceed the average distance between wall elements 76 and 80. A flexible band 86 is secured to walls 76 and 80 and looped in a generally S-shaped fashion around the rotatable elements. The rotatable elements 82 and 84 are free to roll in a direction toward and away from the axis of rotation of the rotatable base. This arrangement of the rollers and S-shaped band is known as a Rolamite device, described in U. S. Pat. No. 3,452,175 in the name of Donald F. Wilkes.

The band 86 is formed with a given geometrical configuration or a suitable slot formed in the band to bias the rotatable elements 82 and 84 radially inward using the principles described in the above-mentioned Wilkes patent. The inward movement of the rotatable elements 82 and 84 is limited by a shaft 88 threaded into an opening 90 in base 74 and positioned to one side of stem 62 so that the inward displacement of the elements 82 and 84 may be adjusted. Access to shaft 88 is provided by opening 89 in housing 64.

The pivot point 78 of the wall element 76 is positioned radially outboard of the elements 82 and 84 so that when these elements are radially inward of the pivot point wall element 76 is maintained generally parallel to and cannot pivot toward wall element 80. Wall element 76 is biased toward element 80 by a spring 94 disposed in a hollow interior 96 of shaft 66 which urges plunger 92 against element 76. The wall element 76 is positioned out of contact with stem 62 when valve element 46 is in its open position for reasons that will be apparent later.

During operation of the gas turbine engine 10 inlet fuel pressure acts on shoulder 58 to keep valve element 46 in an open position. As the engine rotates the shaft 66 and the wall elements rotate causing the elements 82 and 84 to be urged in a radially outward direction. However, the biasing force of the flexible band 86 maintains the elements 82 and 84 inward of pivot point 78. This keeps wall element 76 generally parallel to element 80 and out of contact with stem 62.

When a predetermined rotational rate is attained centrifugal force overcomes the biasing force of the band 86 and the rollers 82 and 84 quickly displace beyond pivot point 78. When this occurs wall element 76 is free to pivot in response to the spring 94 and abuts the stem 62 of valve 46 to displace it to a closed position.

This terminates flow to the engine thereby preventing continuance of the overspeed condition. When this occurs projection 54 extends from housing 34 which permits the valve assembly to be manually reset by pressing projection 54 into the housing, thus pivoting wall element 76 into parallelism with wall 80 and permitting rollers 82 and 84 to be biased toward the center of rotation by the band 86.

The Rolamite principle used in the rotatable elements 82 and 84 is particularly advantageous for this valve assembly. It has very light friction and gives highly repeatable results. In addition, it has no parts that produce substantial sliding friction thereby providing an extremely long life.

The speed at which the rotatable elements displace outward of the pivot point 78 is conveniently set by the threaded shaft 88 to vary the effective centrifugal force acting on them. The valve element 46 is biased in an open direction without the need of springs or other devices thereby further minimizing the complexity of the device.

It should be apparent to those skilled in the art that the valve described above may be used for purposes other than a gas turbine engine fuel shut-off valve. For example, it may be used to either terminate or permit flow in response to the attainment of a predetermined rotational rate supplied by any type of device.

Having thus described the invention, what is claimed as novel and desired to be secured by Letters Patent of the United States is:

1. A flow control valve comprising:
   a housing;
   means for forming a flow path through said housing;
   a valve element displaceable between an open position permitting flow and a closed position blocking flow through said flow path;
   a base journaled in said housing for rotation about an axis;
   first and second spaced opposed walls mounted on said base, said first wall being pivotally mounted at a point radially spaced from said axis for displacing said valve element from one position to another;
   a plurality of rotatable elements positioned between said walls for movement toward and away from said axis;
   a flexible band looped in a generally S-shaped fashion around said rotatable elements and secured to said walls for rolling movement of said band and said elements toward said axis so they maintain said first wall generally parallel to the opposed wall and away from said axis with sufficient displacement to pass radially outward of the pivot point of said first wall;
   said band being positioned for biasing said rotatable elements toward said axis, said elements being displaceable away from the axis and outward of said pivot point in response to centrifugal force at a predetermined rotational rate of said base whereby said first wall is free to pivot and displace said valve element to one of said positions.

2. A flow control valve as in claim 1 further comprising means for yieldably urging said first wall toward said second wall to actuate said valve element whereby the rotatable elements maintain the first wall generally parallel to the second wall against the action of said yieldable urging means when said rotatable elements are radially inward of the pivot point of said first wall.

3. A flow control valve as in claim 2 further comprising means for limiting the radially inward displacement of said rotatable elements.

4. A flow control valve as in claim 3 wherein said limiting means comprises an adjustable stop for adjustably limiting the inward displacement of said rotatable elements whereby the rotational rate at which the rotatable elements move radially outward of said pivot point may be varied.

5. A flow control valve as in claim 2 wherein:
   said first wall directly acts to displace said valve element; and
   said first wall is out of contact with said valve element when the rotatable elements are radially inward of said pivot point whereby wear on said valve element is eliminated.

6. A flow control valve as in claim 2 wherein:
   said valve element is displaceable generally in line with said yieldable urging means; and
   said valve element has a projection which extends from said housing when the valve element is displaced by said first wall so that said valve element may be reset.

7. A flow control valve as in claim 6 wherein said valve element is in a normally open position and said first wall is adapted to pivot out of parallelism with said second wall to displace said valve element to a closed position in response to said predetermined rotational rate of said base.

8. A flow control valve as in claim 6 wherein:
   said means for forming a flow path comprises inlet and outlet ports formed in said housing and connecting respectively to upstream and downstream sides of a chamber separated by a central orifice;
   said valve element comprises a spool valve element with a shoulder displaceable in the downstream chamber toward the orifice, the pressure areas of said shoulder being selected so that fluid pressure biases said valve element toward an open position.

9. A flow control valve as in claim 8 wherein:
   said housing has a generally cylindrical portion enclosing said rotatable base;
   said base comprises a hollow shaft generally coaxial with and journaled in said cylindrical portion of said housing and an integral wall support portion extending from said base;

said second wall comprises a wall portion of said base generally normal to the axis of rotation of said shaft and said first wall comprises a wall element having a pivot point radially outward of the axis of rotation of said shaft and having a free end extending past the axis of rotation of said shaft and positioned generally normal to the axis of rotation when the rotatable elements are radially inward of said pivot point;

said yieldable urging means comprises a spring and a plunger positioned in said hollow shaft for acting on said first wall element in a direction pivoted toward the second wall element;

said valve element has a stem in general axial alignment with said shaft extending to a point adjacent the pivotal wall element.

10. A flow control valve as in claim 9 further comprising an adjustable set screw threadably supported by the wall support portion of said base and positioned in a direction to adjustably limit the radial inward movement of said rotatable elements and said S-shaped band.

* * * * *